Dec. 23, 1952 A. R. CONSTANTINE 2,622,352
IRONING MACHINE

Filed April 9, 1945 12 Sheets-Sheet 1

INVENTOR.
ARTHUR R. CONSTANTINE
BY
M. W. Green.
ATTORNEY

Dec. 23, 1952     A. R. CONSTANTINE     2,622,352
IRONING MACHINE

Filed April 9, 1945     12 Sheets-Sheet 2

INVENTOR.
ARTHUR R. CONSTANTINE
BY M. W. Green
ATTORNEY

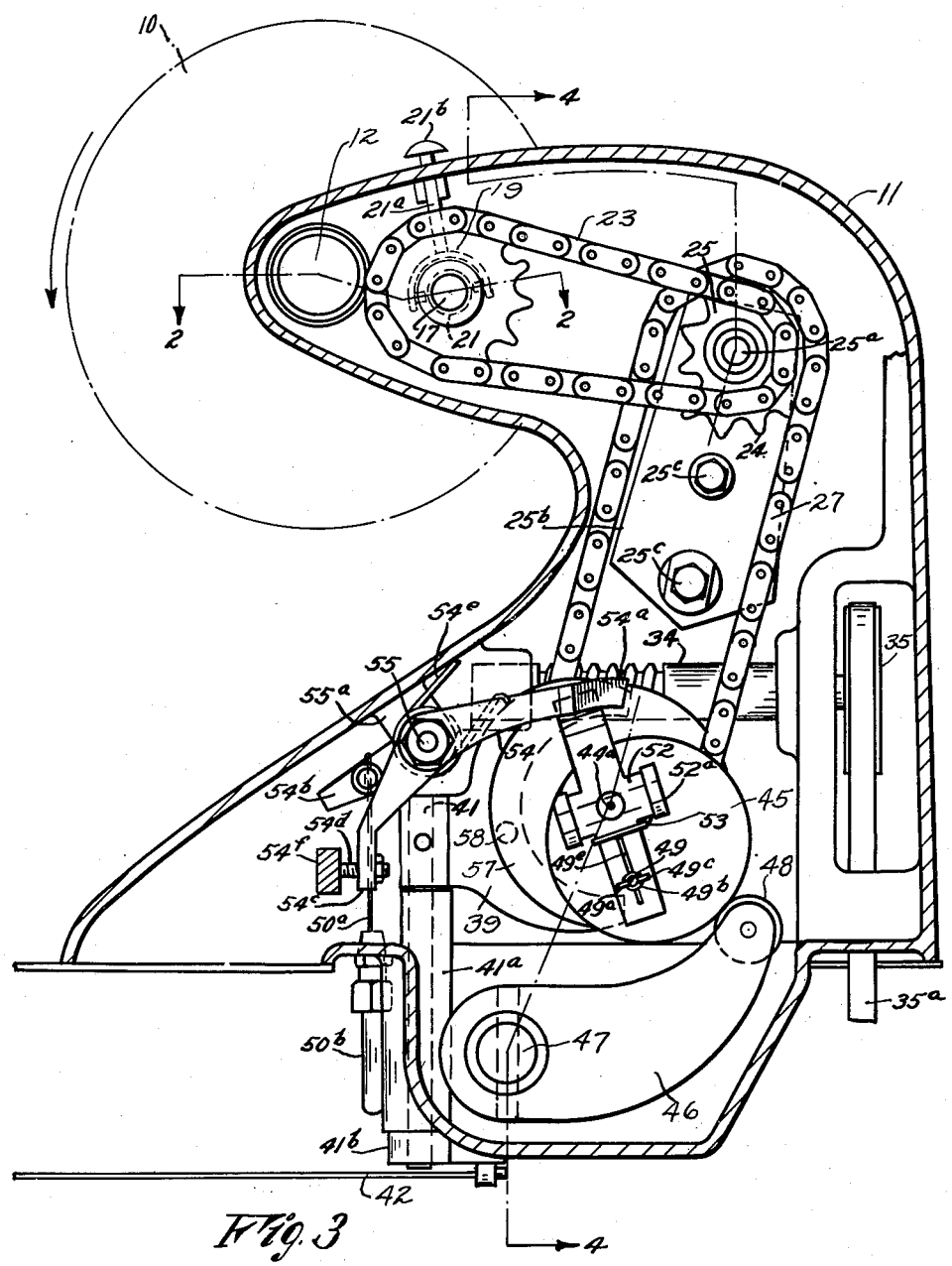

Dec. 23, 1952  A. R. CONSTANTINE  2,622,352
IRONING MACHINE
Filed April 9, 1945  12 Sheets-Sheet 4
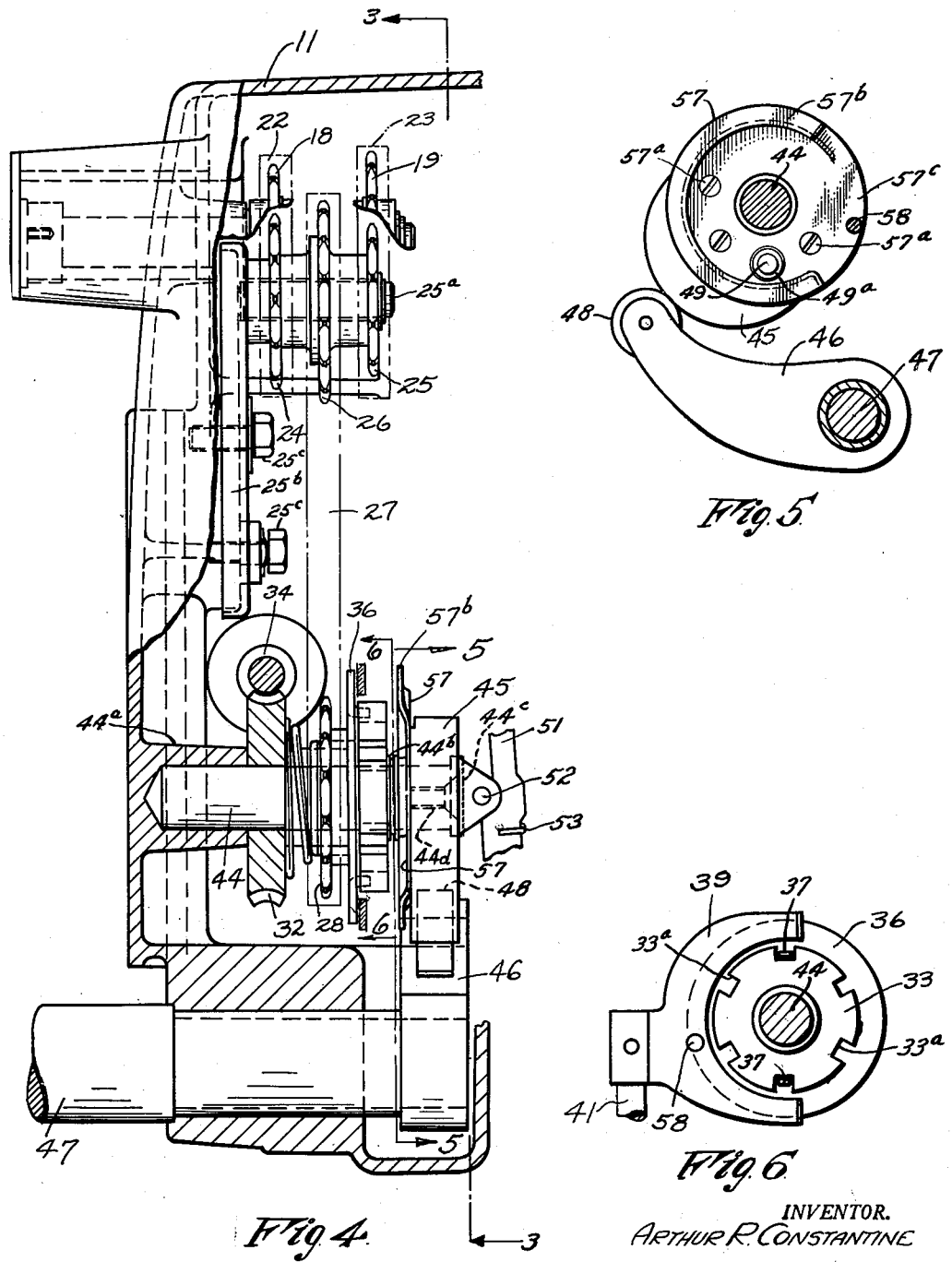
INVENTOR.
ARTHUR R. CONSTANTINE
BY
M. W. Green.
ATTORNEY Dec. 23, 1952  A. R. CONSTANTINE  2,622,352
IRONING MACHINE Filed April 9, 1945  12 Sheets-Sheet 5

INVENTOR.
ARTHUR R. CONSTANTINE
BY
M. W. Green.
ATTORNEY

Inventor
ARTHUR R. CONSTANTINE
By M. W. Green
Attorney

Dec. 23, 1952 A. R. CONSTANTINE 2,622,352
IRONING MACHINE
Filed April 9, 1945 12 Sheets-Sheet 7

INVENTOR.
ARTHUR R. CONSTANTINE
BY M.W. Green.
ATTORNEY

Dec. 23, 1952 A. R. CONSTANTINE 2,622,352
IRONING MACHINE
Filed April 9, 1945 12 Sheets-Sheet 8

INVENTOR.
ARTHUR R. CONSTANTINE
BY
M. W. Green
ATTORNEY

Dec. 23, 1952  A. R. CONSTANTINE  2,622,352
IRONING MACHINE
Filed April 9, 1945  12 Sheets-Sheet 9

INVENTOR.
ARTHUR R. CONSTANTINE
BY M. W. Green
ATTORNEY

Dec. 23, 1952  A. R. CONSTANTINE  2,622,352
IRONING MACHINE
Filed April 9, 1945 12 Sheets-Sheet 10
Fig. 16
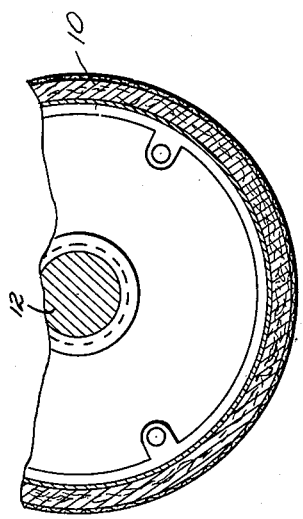
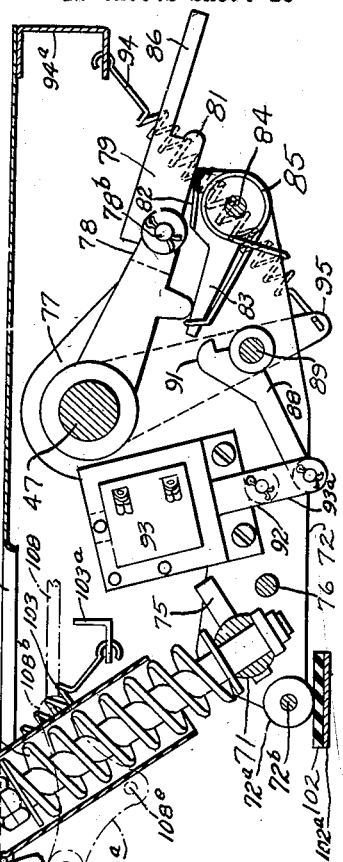
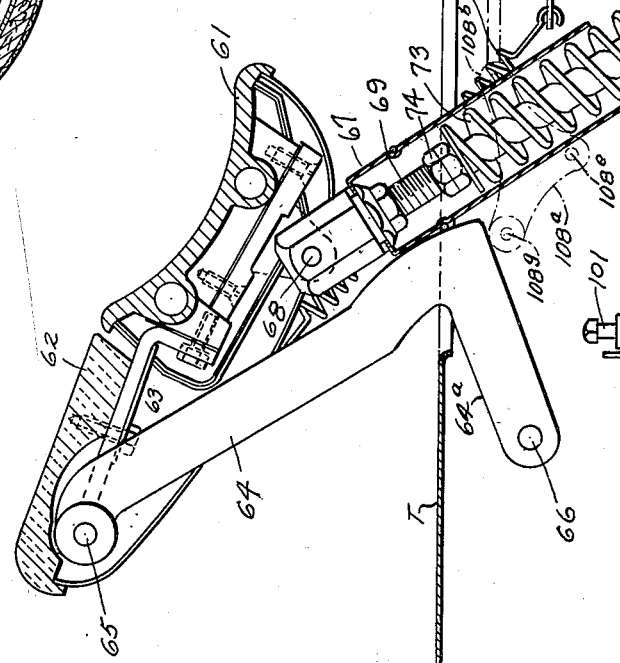
INVENTOR.
ARTHUR R. CONSTANTINE
BY M. W. Green
ATTORNEY.

Dec. 23, 1952　　　A. R. CONSTANTINE　　　2,622,352
IRONING MACHINE
Filed April 9, 1945　　　　　　　　　　　　12 Sheets-Sheet 11
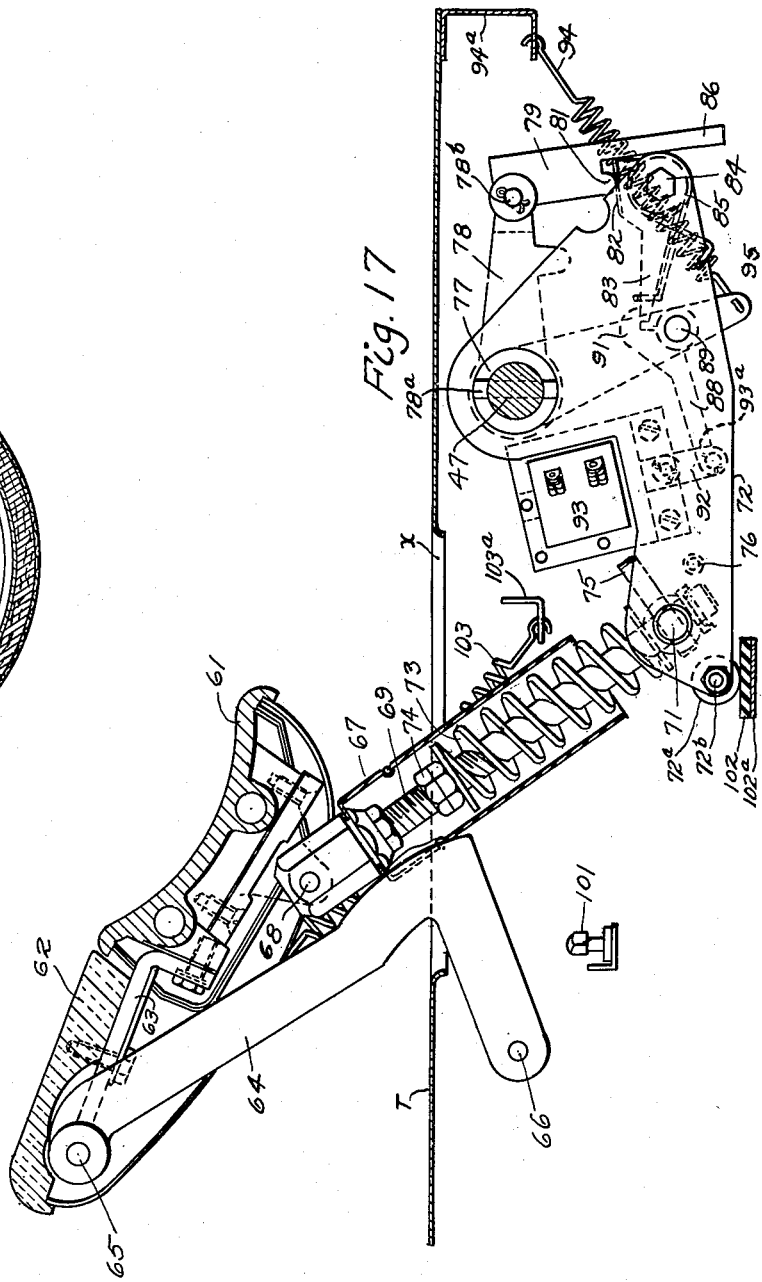
INVENTOR.
ARTHUR R. CONSTANTINE
BY　M. W. Green
ATTORNEY

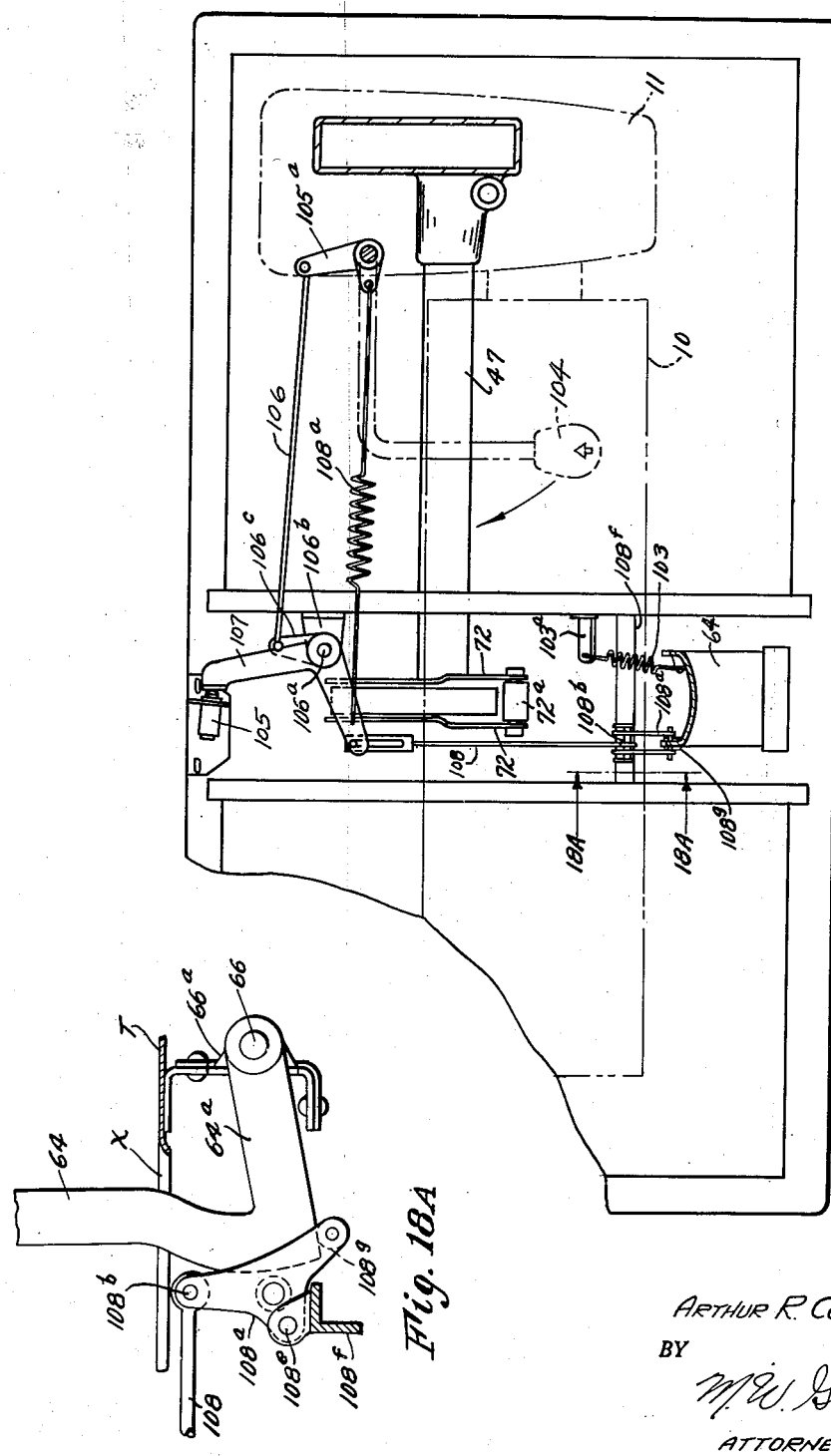

Patented Dec. 23, 1952

2,622,352

UNITED STATES PATENT OFFICE 2,622,352

IRONING MACHINE

Arthur R. Constantine, South Bend, Ind., assignor, by mesne assignments, to Avco Manufacturing Corporation, New York, N. Y., a corporation of Delaware Application April 9, 1945, Serial No. 587,315

5 Claims. (Cl. 38—61)

This invention relates to ironing machines of the type employing a padded roll operated to iron or press articles between such roll and a heated shoe.

It is a primary object of the present invention to provide an ironing machine having an arrangement of shoe and roll in combination with drive mechanism which provides an improved operation thereof from the standpoint of ease of operation and safety.

It is a further object to provide an ironing mechanism so arranged in combination with drive and support mechanism for a shoe and roll which will permit ironing operations to be efficiently performed.

It is a further object to provide mechanism for moving an ironing machine shoe with respect to ironing position to and from a roll in such a manner as to make possible a release of such shoe from its actuating mechanism at any time during its operation and to allow such shoe to be moved to a normal down position or to a safety position a greater distance away from the roll.

The above and other objects of the invention will appear more fully from the following more detailed description and by reference to the accompanying drawings forming a part hereof and wherein:

Figure 3 is a sectional view taken on the line 3—3 of Figure 4 showing the drive mechanism for the roll and the control means for effecting actuation of the shoe;

Figure 4 is a sectional view through the drive mechanism taken on the line 4—4 of Figure 3;

Figure 5 is a sectional view taken on the line 5—5 of Figure 4;

Figure 6 is a sectional view taken on the line 6—6 of Figure 4;

Figure 1:
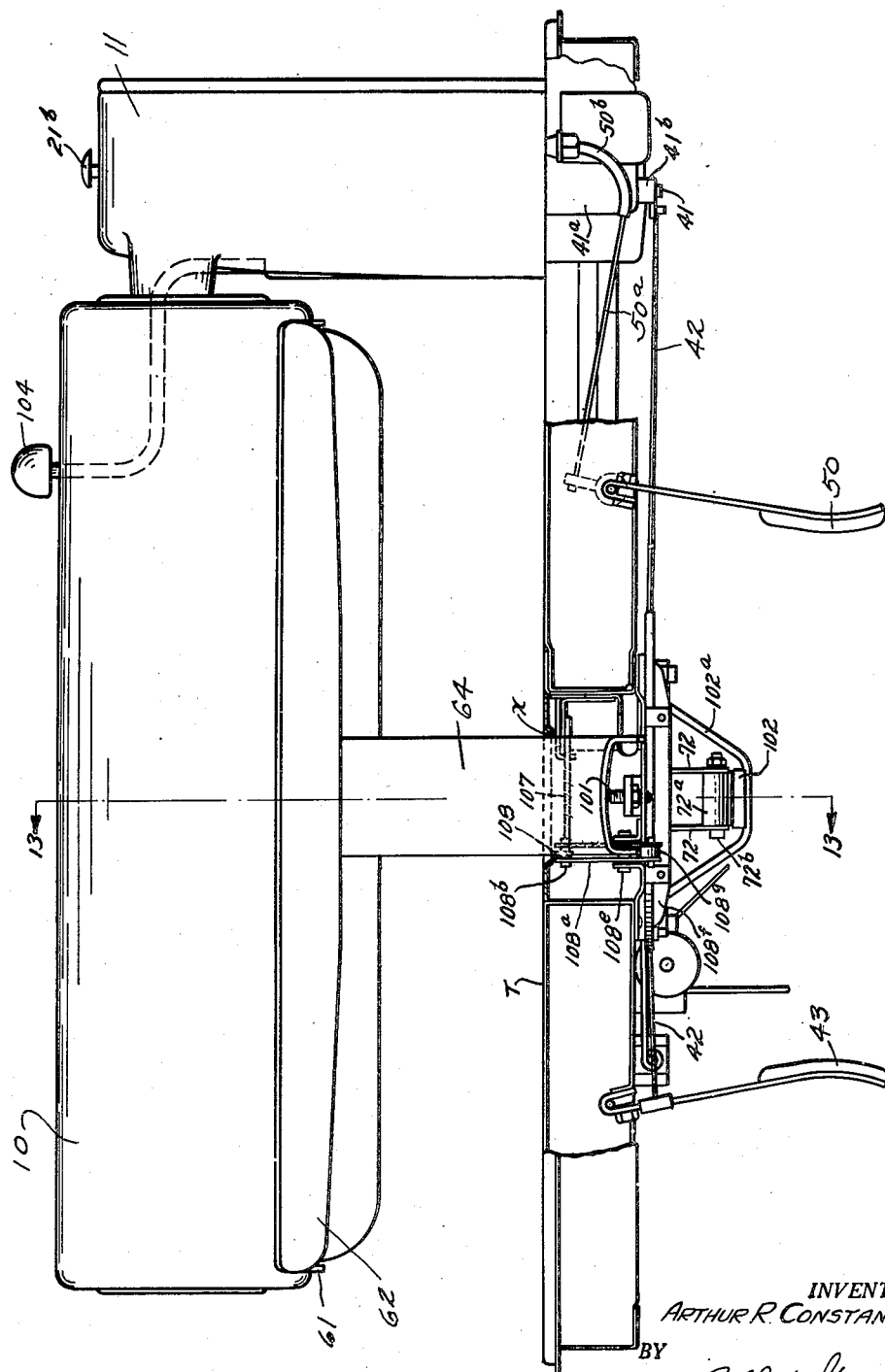
Figure 1 is a front elevational view of an ironing machine embodying the principles of this invention, with certain parts broken away to facilitate illustration.
Figure 19:
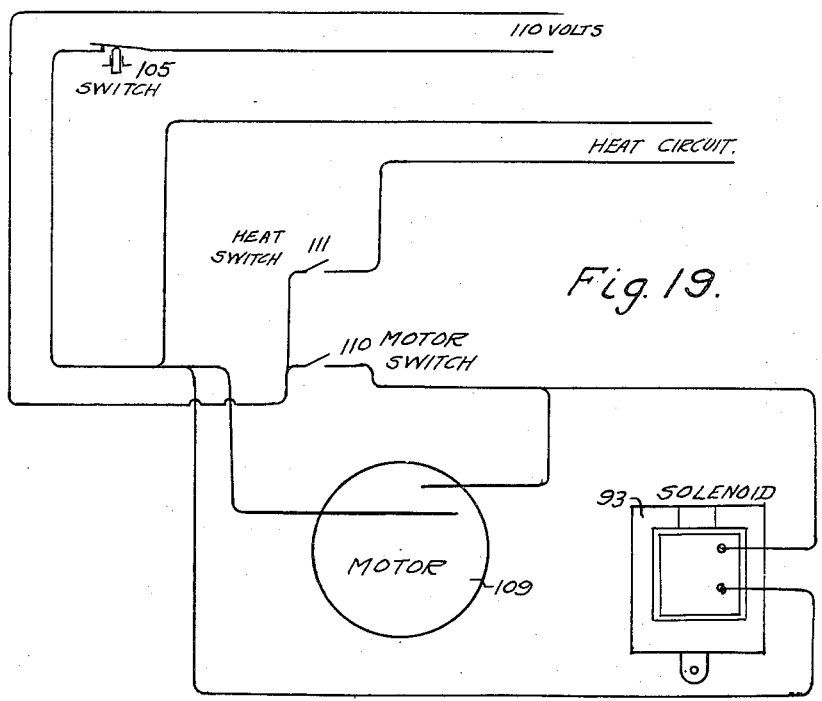
Figure 9:
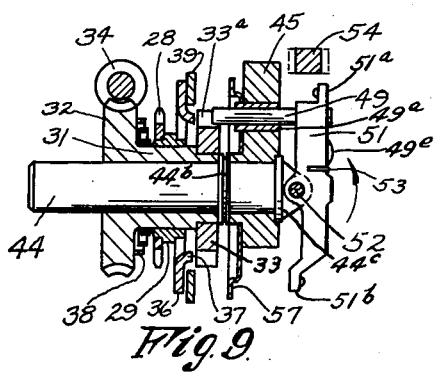
Figures 9 and 10 are views similar to Figures 7 and 8 but showing the position of the parts when the controls have been actuated to start the shoe toward the roll.
Figure 10:
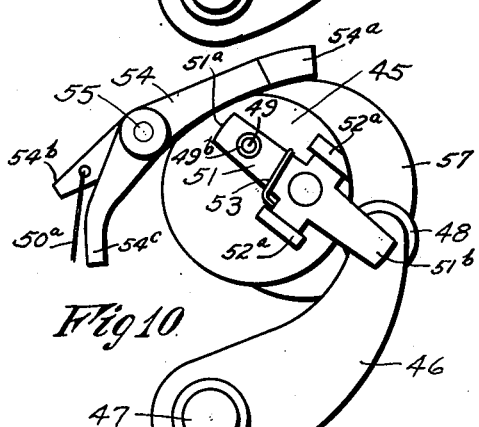
Figure 11:
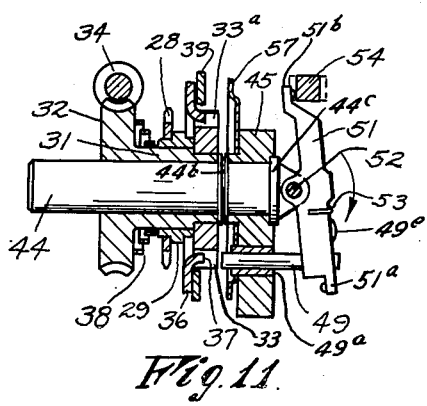
Figure 12:
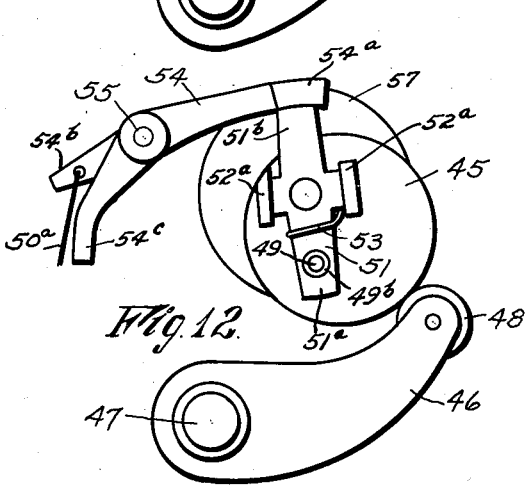
Figure 13:
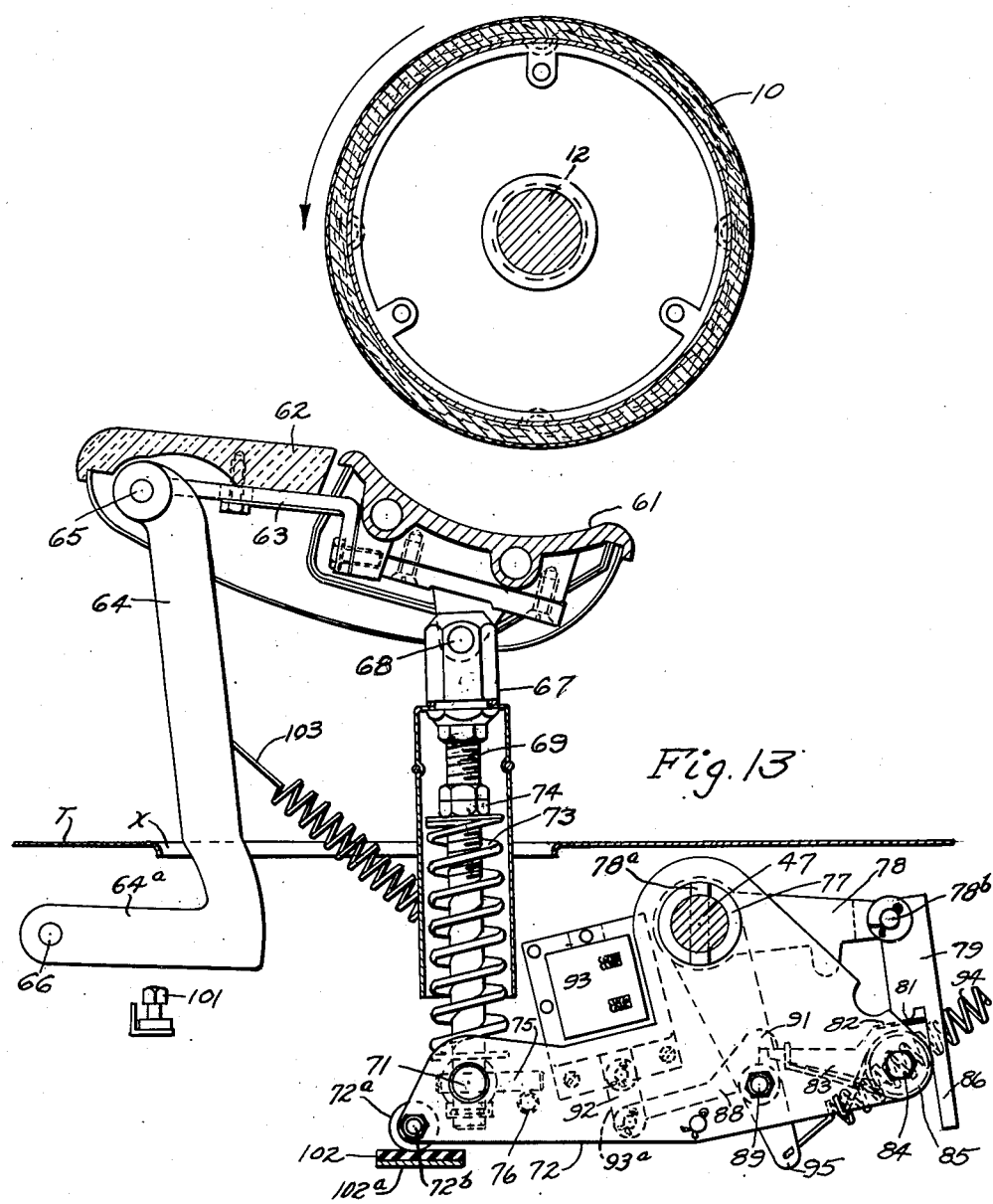
Figure 14:
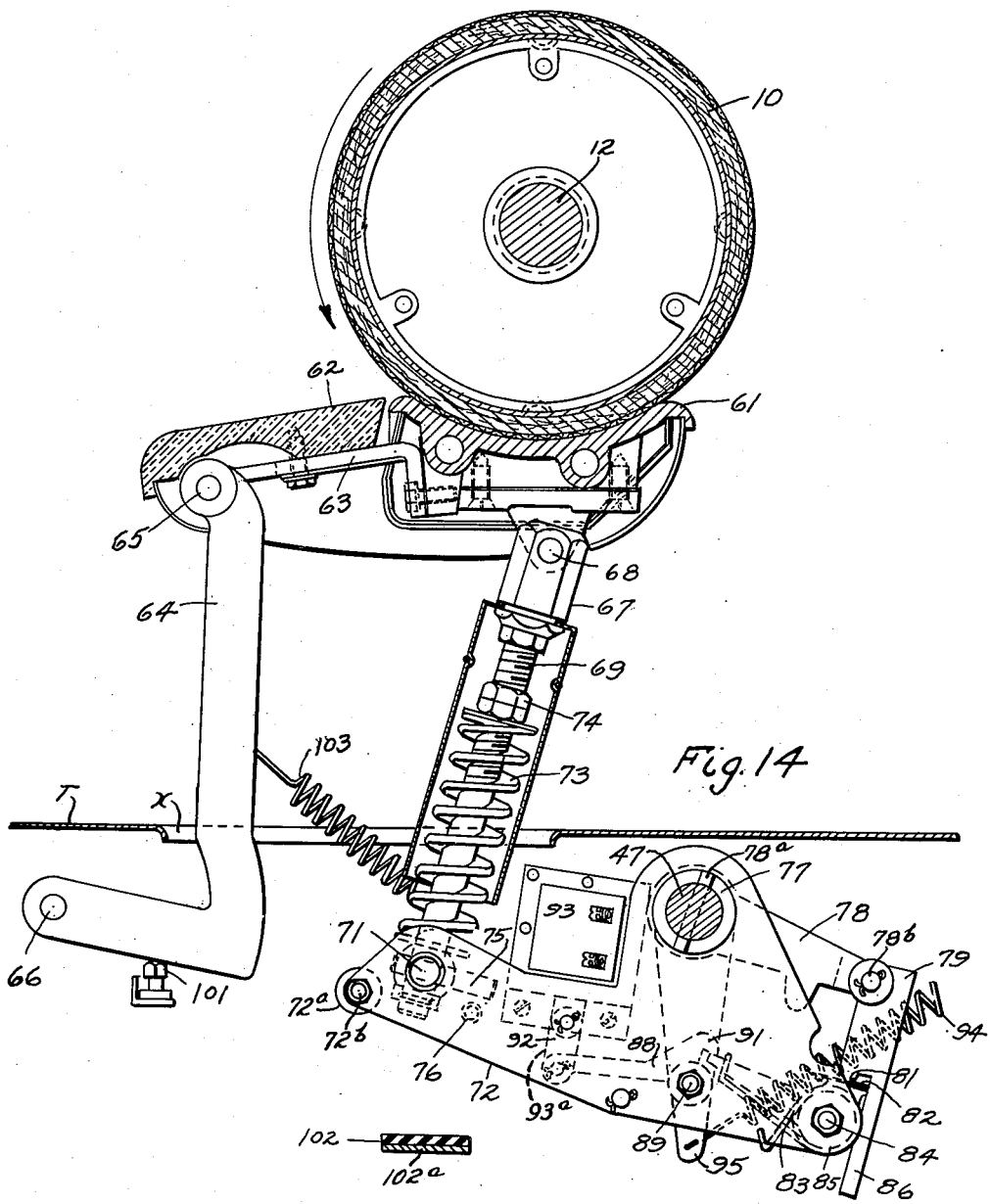
Figure 15:
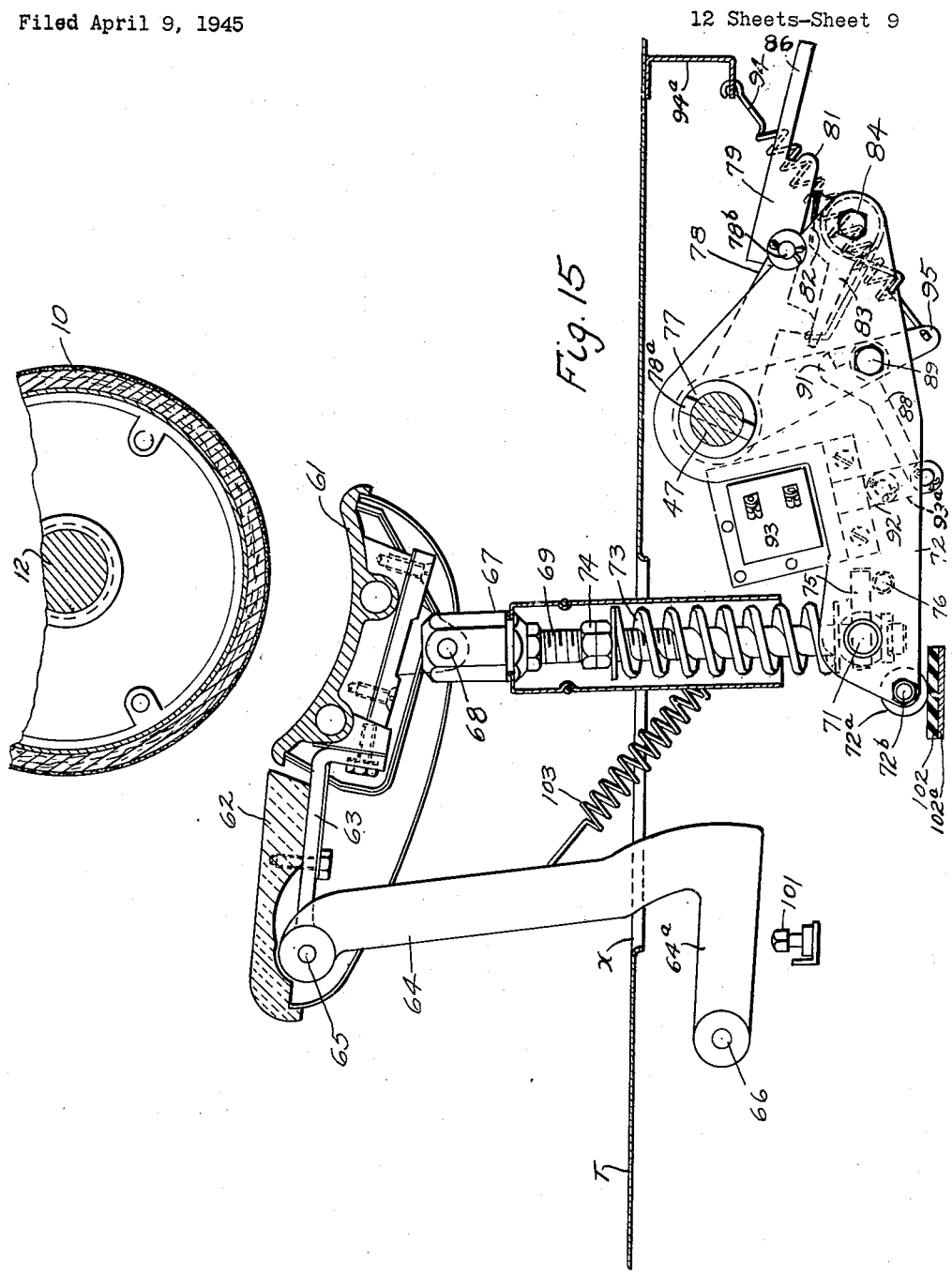

Figures 11 and 12 are views similar to Figures 7 and 8, and Figures 9 and 10, but showing the position of the parts when the shoe has been moved to a position contacting the roll;

Figure 13 is an enlarged vertical sectional view taken on the line 13—13 of Figure 1, through the roll and shoe, showing the support and drive mechanism under the shoe and table for moving the same toward and from the roll; the shoe, however, being shown in its normally down position away from the roll;

Figure 14 is a view showing the same mechanism as Figure 13, but with the parts in position to hold the shoe against the roll;

Figure 15 is a view similar to Figure 13, but showing the shoe moved away from the roll to its normal down position after actuation of a safety release mechanism;

Figure 16 is a view showing the shoe moved to a safety position a maximum distance away from the roll as a result of actuation of the safety release mechanism;

Figure 17 is a view showing the shoe moved away from the roll a maximum distance into its safety position, and to which safety position it may be moved manually from the normal down position shown in Figure 13, without actuation of the safety release mechanism;

Figure 18 is a diagrammatic plan view of the ironing machine showing the connections under the table to the safety release mechanism and the means whereby the safety lever may be actuated to push the shoe to the maximum open position;

Figure 18A is a fragmentary sectional view taken on the line 18A—18A of Figure 18; and Figure 19 is a wiring diagram schematically showing the circuit for establishing the various electrical connections to the several units.

Figure 2:
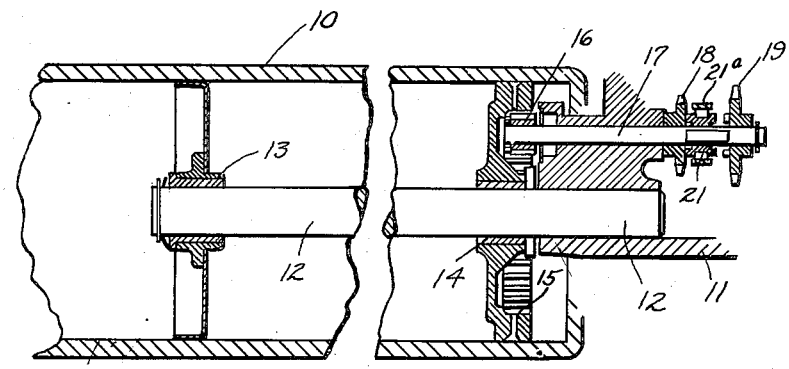
Figure 2 is a fragmentary sectional view taken on the line 2—2 of Figure 3, diagrammatically showing the roll support and drive means therefor.

Referring to the drawings, a hollow ironer roll 10 is mounted for rotation, supported and driven from one end, the end support being produced by means of a casting 11 and shaft 12 which is supported in and extends outwardly from the casting inside the roll 10. As shown in Figure 2, the roll 10 has an inner bearing 13 and a second bearing 14 near its end adjacent casting 11.

Figure 9A:
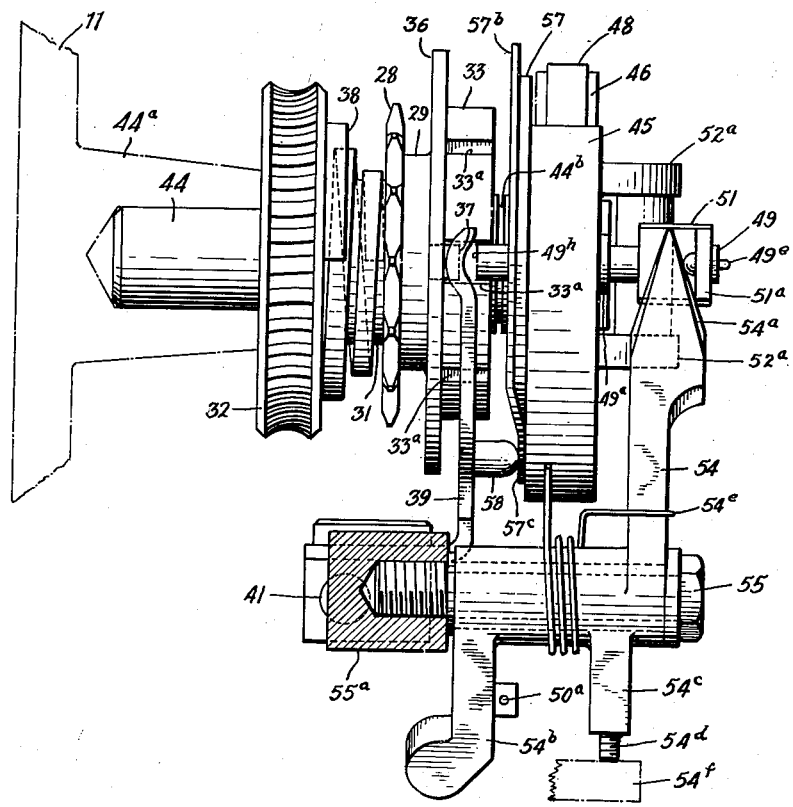
Figure 9A is an enlarged view somewhat similar to Figure 9, but showing the parts in greater detail.
Figure 9B:
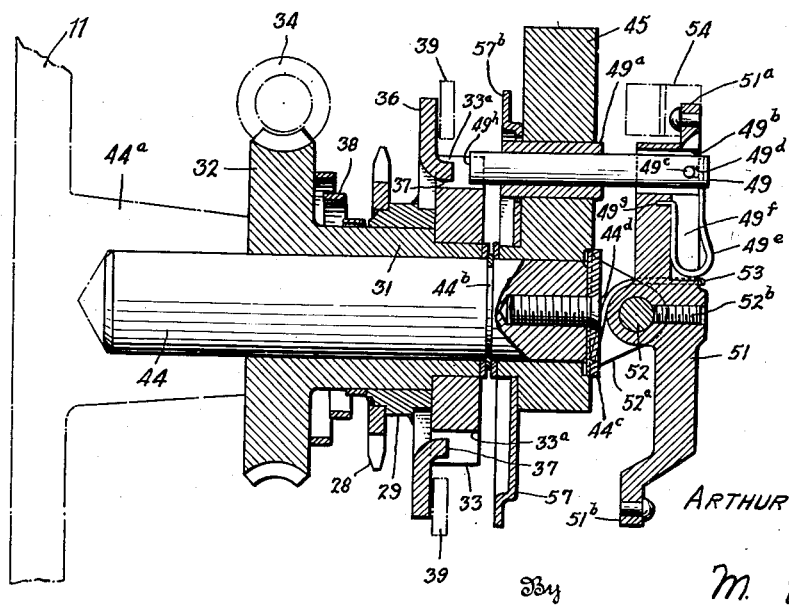
Figure 9B is a sectional view of the structure shown in Figure 9A.

In line with the bearing 14 there is also an internal drive gear 15 inside the roll 10. It is apparent on inspection of Figure 2 that the roll 10 is mounted for free rotation upon the stationary shaft 12 by means of bearings 13 and 14 and is driven through the internal gear 15 by a pinion 16 which meshes with the gear 15 and is driven from a shaft 17 which extends inside the casting 11. The inwardly extending end of the shaft 17 has two sprockets 18 and 19 mounted for rotation thereon, which sprockets may be selectively secured to rotate with the shaft 17 by a sliding clutch member 21 actuated manually by any suitable or conventional yoke mechanism 21$^a$ having a knob 21$^b$. Drive chains 22 and 23 (Figures 3 and 4) are connected to drive the sprockets 18 and 19, respectively, the opposite ends of the chains being carried around sprockets 24 and 25 which are mounted to rotate upon a stud shaft 25$^a$ together with a third sprocket 26 which is driven by a main drive chain 27 from a main drive sprocket 28. The shaft 25$^a$ is fixed to a bracket 25$^b$ secured to the casting 11 by fastening elements 25$^c$. The sprocket 24 is of larger diameter than the sprocket 25 and the sprocket 19 is of larger diameter than the sprocket 18 so that the chain drive thus affords two different speeds of rotation for the roll 10 as selected by the clutching of sprocket 18 or sprocket 19 to shaft 17 by the clutch member 21. The main drive sprocket 28 is welded or otherwise secured to and carried by a bushing 29 (Figs. 7, 9, 9A and 11) which is mounted for rotation upon an intermediate portion of a worm wheel hub 31 which extends outwardly from a worm wheel 32. The worm wheel hub 31 and worm wheel 32 form an integral unit, to the end of which is secured a notched clutch member 33. The worm wheel 32 is driven by a worm 34 which is driven by the main driving motor (not shown, except in Figure 19) of the machine through a pulley 35 (Figure 3) and a belt 35$^a$. It is apparent that when the worm 34 is driven continuously, the worm wheel 32 and the notched clutch member 33 will also be driven continuously. Again referring to the main drive sprocket 28 and its bushing 29 which is free to rotate upon the worm wheel hub 31, the outer end of the bushing 29 has a clutch plate 36 secured to rotate therewith, this clutch plate having extending lugs 37 adapted to extend into the notches 33$^a$ of the notched clutch member 33. In fact, the assembly carrying the sprocket 28 and the plate 36 is normally urged axially in a direction to keep these projections 37 in the notches 33$^a$ of the clutch member 33 by the action of a spiral type compression spring 38, which is interposed between the worm wheel 32 and the adjacent end of the bushing 29. The clutch plate 36 has an annular peripheral portion which extends beyond the circumference of the notched clutch member 33 in such a position that it may be contacted by an actuating yoke 39 (Figures 3 and 6) which has extending arms suitable for contact with the extending portion of the clutch plate 36. The actuating yoke 39 is mounted upon the upper end of a shaft 41 which pivots in a boss 41$^a$ formed integral with the casting 11. An arm 41$^b$ is secured to the lower end of the shaft 41 and a cable 42 is connected to said arm so that rotation of this shaft by pulling the control cable 42 will actuate the yoke member 39 to push the clutch plate 36 in a direction to pull the lugs 37 out of engagement with the notches 33$^a$ in the clutch member 33. Control cable 42 is connected to be operated by the knee control lever 43 (Figure 1); although, as will be apparent later, this is not the primary operating means for the actuating member 39. But such actuation will cause the roll 10 to stop its rotation by disconnecting the lugs 37 from the notches 33$^a$ of the clutch member 33. The worm wheel and hub unit 31 and 32 is mounted to rotate freely upon a support shaft 44 which has one end thereof mounted in a boss 44$^a$ (Figures 4 and 9A) formed within the casting 11. The shaft 44 extends outwardly from the boss 44$^a$ a sufficient distance to support the worm wheel 32 and sprocket unit 28—29 and to carry also a cam member 45 on its inner end which is also mounted to rotate freely on the shaft 44 between a retainer ring 44$^b$ and a retainer disc 44$^c$, the latter being secured to the end of the shaft 44 by a countersunk screw 44$^d$. The rotation of the cam member 45 will oscillate a lever 46 which is connected to an oscillatable shoe operating shaft 47. The end of the lever 46 has a cam contacting roller 48. As will later be apparent, the maximum positions of the lever 46 bring an ironing shoe 61 into and out of engagement with the roll 10. It is, therefore, necessary to provide means to rotate the cam 45 a half revolution, first to bring the lever 46 into one of its maximum positions and then to rotate a second half revolution to place the lever 46 in its opposite position, thereby to bring the shoe 61 from a non-contacting to a contacting ironing position. The intermittent drive mechanism for accomplishing this purpose comprises a control device for clutching the cam unit 45 to the notched clutch member 33, the same notched clutch member which was referred to in the description of the roll drive and which is continuously rotated through the worm wheel 32. For the purpose of connecting cam 45 with the notched clutch member 33, a pin 49 extends through a sleeve 49$^a$ in the cam member 45 at a position to slide into one of the notches 33$^a$ of the member 33 on axial movement of the pin 49. This pin is connected to one end of a pivoted lever member 51, as best shown in Figure 9B. Thus, the pin 49 extends into an oversize opening 49$^b$ in the lever 51 and is pivotally connected to said lever by a relatively smaller pin 49$^c$ extending therethrough and into a pair of transverse open slots 49$^d$ formed in said lever. The pin 49 is also connected to one end of a general U-shaped spring 49$^e$ disposed in a radial slot 49$^f$ in the lever 51. The opposite end of the spring 49$^e$ is anchored at 49$^g$ to the lever 51. This mounting arrangement for the pin 49 provides for yielding engagement of the end 49$^h$ thereof with the adjacent face of the clutch member 33 until said pin enters one of the notches 33$^a$ in said clutch member, and also provides for positive disengagement of said pin from said notch to provide an intermittent drive for the cam 45, in accordance with the actuation of the lever 51, all as will be more fully set forth in detail hereinafter.

The lever 51 is mounted on a pivot pin 52 carried by a pair of lugs 52$^a$ formed integral with the cam 45, and a set screw 52$^b$ in the arm 51 retains said arm and pin in assembled relation with said lugs. The axis of the pivot pin 52 is transverse to and lies substantially at the axis of the stationary shaft 44. A spring 53 normally urges the pivoted lever 51 in a direction such that the pin 49 is normally engaged with the notched clutch member 33 unless the lever 51 is held against the action of the spring 53. In order to hold the pin 49 out of engagement and to, therefore, hold the cam 45 in a stationary position in relation to the clutch member 33, the lever 51 is provided with offset projections 51$^a$ and 51$^b$ at the opposite ends thereof and an actuating arm 54 having a tapered or chisel-shaped end 54ª is so positioned in the path of normal travel of the ends 51ª and 51ᵇ of the lever 51 and is so shaped that upon rotation of the cam 45, which rotates with the lever 51, the tapered end 54ª will contact the end 51ª of the lever 51 and by such contact push the end 51ª of the lever 51 in a direction to cause the pin 49ᶜ to positively pull the pin 49 out of engagement with one of the notches 33ª in the clutch member 33. It is to be noted that the opposite ends 51ª and 51ᵇ of the lever 51 are adapted to contact opposite sides of the tapered end 54ª of the actuating arm 54 to, in each case, pull the pin 49 out of contact. The actuating arm 54 is pivoted upon a pin 55 mounted in a lug 55ª (Figure 3) extending inwardly from the front wall of the casting 11. A projection 54ᵇ is made integral with the arm 54 and has one end of a cable 50ª secured thereto. The cable 50ª extends through a curved guide tube 50ᵇ mounted on the casting 11 and the opposite end of the cable 50ª is secured to a knee control lever 50 (Figure 1). The arm 54 also has an integral extension 54ᶜ carrying an adjustable bolt 54ᵈ. A spring 54ᵉ mounted on the arm 54 tends to maintain the actuating arm 54 in the position shown in Figure 3 with the bolt 54ᵈ engaging a stop 54ᶠ. Hence, when the actuating arm 54 is swung upwardly by a pull of the cable 50ª produced by actuation of knee control 50, and the end 54ª is thus moved away from the end 51ª of lever 51, the spring 53 will then cause the lever 51 to swing in a direction to push the pin 49 into one of the notches 33ª of the clutch member 33. Force is applied to the pin 49 by the spring 49ᵉ and the end 51ª is permitted to move slightly longitudinally relative to said pin by the lost motion connection provided by the pin 49ᶜ and the slots 49ᵈ. Upon engagement of the pin 49 with one of the notches 33ª in the clutch member 33, the cam 45 will rotate and continue to rotate as long as the actuating arm 54 is held so that it will not contact either of the ends 51ª and 51ᵇ of the lever 51. However, in case it is desired only to move the cam 45 a half revolution, the end 54ª of the actuating member 54 will be moved away from the end 51ª or 51ᵇ of the lever 51 which it is then contacting, by movement of knee control 50 and when the pin 49 makes contact it will cause the cam 45 to rotate, and, if the member 54 is allowed to drop down into its original position by the action of the spring 54ᵉ upon release of the knee control 50, it will then be ready to contact the opposite end of the lever 51 as it swings around at the next 180° of rotation and when member 54 contacts said opposite end of the lever 51 it will immediately pull the pin 49 out from contact with the clutch member 33 and stop the rotation of the cam 45. It is apparent, therefore, that unless the actuating arm 54 is pulled out of its normal position by the knee control 50, or other means exerting a pull on cable 50ª, the end 54ª of the arm of member 54 will be in contact, within the next 180° of rotation, with one end or the other of the lever 51 and will casue the cam 45 to stop in one or the other of its maximum positions corresponding to the maximum oscillating positions of the lever 46, and when the member 54 is actuated by knee control 50 and immediately released and allowed to assume its normal position it will cause a half revolution of the cam 45 on each such actuation.

It was previously mentioned that the actuating yoke 39 controlling the clutch connection for rotation of the roll 10 might be actuated by means other than the control cable 42 and the knee control 43. Accordingly there is provided another and primary means of actuating the roll 10 which is by means of a cam member 57 mounted to rotate with the cam member 45 and attached to the side thereof nearest the clutch member 33 by a plurality of screws 57ª (Figure 5). The cam 57 is circular and apertured for the passage of the bushing 49ª and the shaft 44. This cam, as will be noted in Figure 5, is so constructed as to provide a cam track 57ᵇ at its periphery normally in contact with a projecting pin 58 secured to the actuating yoke 39. The cam track 57ᵇ includes a depressed portion 57ᶜ arranged so that upon rotation of the cam 45 and upon engagement of the pin 58 with the cam portion 57ᶜ, the actuating yoke 39 will be moved to cause the roll clutch to be engaged in the desired relation to the rotation of the cam 45 which, as will be later apparent, controls the movement of the shoe 61 to and from the roll 10. It is thus evident that the cam 57, through its engagement with the pin 58, synchronizes the movement of the roll clutch 33 with the movement of cam 45 which actuates the shoe 61, assuring that the roll clutch 33, due to the design of the cam track 57ª, will be brought into engagement in time to have the roll 10 rotating when the ironing shoe 61 is brought into contact with the roll 10.

As previously mentioned, the rotation of the cam 45 causes an oscillating movement of the lever 46 against which it operates by a contact with the cam contacting roller 48. And also as previously stated, the lever 46 is secured to the end of the shaft 47, which is therefore oscillated and which extends under the main table T to a point approximately at the center of the roll 10. At this central portion of the roll 10 and under the roll 10, provision is made for the support of an electrically heated ironing shoe 61 which carries a table 62 along its front edge. Under the table 62 and extending from the front edge of the shoe 61 are bracket extension members 63, to the end of which is secured a lever member 64 which has an upper pivot 65 under the table 62 and a lower pivot 66 on bracket means 66ª (Figure 18A) just under the main table T. Lever member 64 extends through an opening X in the table T and is of substantial width, as can be seen in Figure 1, and thus affords a substantial rigidity to the shoe in a longitudinal direction. In effect, this wide lever 64 affords the same support as would two spaced levers. Support for the shoe 61 is completed by a support member 67 (Figures 13 to 17) located substantially under the central portion of the shoe 61. This support 67 is pivoted to the under side of the shoe 61 at 68 and has a threaded portion 69 and extends downwardly through a pin 71 which is carried between spaced plates 72 of a bell crank lever. The member 69 has a spring 73 surrounding it which is held between a nut 74 and the previously-mentioned pin 71, so that, if pressure is exerted from the bell crank lever 72 upwardly, the spring 73 will be placed under compression and the force transmitted will actually be through the spring 73. The pin 71 has a stop member 75 extending therethrough which abuts against a stop 76 carried between the plates 72. The stop member 75 and the stop 76 provide limitation for the rotation of the pin 71 in a clockwise direction in the plates 72 of the bell crank. The stop member 75 is offset from the member 69 and does not extend therethrough and the member 69 is therefore free to slide relative to pin 71.

The plates 72 have freedom of rotation around the projecting bosses 77 of a lever 78, which lever is secured by a pin 78a to the shaft 47. So, in effect, the bell crank lever plates 72 are free to rotate relative to the shaft 47. In order to make a connection between bell crank lever plates 72 and the shaft 47, the end of the lever 78 is pivotally secured by a pin 78b to a pusher lever 79 which has an abutment 81 adapted to contact a face 82 of an intermediate latching member 83. This intermediate latching member 83 is mounted to swing upon a pivot 84 and is normally urged in a counter-clockwise direction, as viewed in Figure 13, by a torsion spring 85. The pusher lever 79, previously mentioned, has an extension 86 which extends beyond the abutment portion 81. The abutment portion 81 contacts the surface 82 at a point such that the push exerted upon the upper end of the pusher lever 79 will tend to rotate the intermediate latching lever 83 in a direction clockwise, as shown in Figure 13, against the action of the spring 85. It is evident upon inspection that this result is accomplished when the direction of the force exerted through the pusher lever 79 is to the right of pivot 84. A solenoid latch lever 88 is pivoted on the pin 89 and has a latch portion 91 which contacts the end of the intermediate latching lever 83 on clockwise rotation of the solenoid latch member 88 about the pin 89. The opposite end of the latch member 88 is secured to an armature 92 of a solenoid 93 by a link 93a so that when the solenoid 93 is energized by closing the electrical circuit thereto, the latch member 88 will be moved to its maximum position clockwise by the electromagnetic means of the solenoid 93 to hold the end of the intermediate latching lever 83 in latched position as shown in Figure 13. The entire linkage above mentioned, which is connected to the end of the lever 78, is carried between the two bell crank plates 72 and it is apparent that as long as the abutment 81 is in contact with the face 82 and the intermediate latching lever 83 is held in position by the energized solenoid 93, the clockwise movement of the shaft 47 will push against the support member 67 through the resilient support of spring 73 to push the ironing shoe 61 in an upward direction into engagement with the roll 10.

In order that the shaft 47 may be normally held in its maximum position in a counter-clockwise direction with the shoe 61 away from the roll 10, one end of a spring 94 is secured to the end of this shaft through a lever 95 and the other end of said spring is fastened to a channel member 94a (Figure 15) and, as seen in Figures 13 and 15, the spring 94 will tend to urge the shaft 47 in a counter-clockwise direction and the clockwise rotation of the shaft 47 will, therefore, act against the tension of the spring 94. Inasmuch as the force of gravity will tend to cause the shoe 61 to fall away from the roll 10 into the position shown in Figure 13, the tension of the spring 94 is added to this force and, therefore, the force which tends to move the shoe 61 away from the roll 10 is the force of gravity plus the tension of the spring 94, while the force tending to move the shoe 61 upwardly toward the roll 10 is that force exerted by the cam 45 through the lever 46 and the shaft 47 through the bell crank members 72 to lift the shoe 61 against the force of gravity and against the spring 94. It may, therefore, be said that the actuating mechanism provided herein only moves the shoe 61 toward the roll 10 and that gravity and the spring pressure from spring 94 are separate forces which move the shoe 61 away from the roll 10.

It is noted that the lever 64 is of L shape and has a forwardly extending or lateral portion 64a ahead of the pivot 66 and that a stop 101 is provided under the lever 64 as a limit to its movement in a clockwise direction about the pivot 66. A rubber stop 102 carried by a bracket 102a is provided for the bell crank assembly made up of the previously mentioned plates 72, a roller 72a mounted on a pin 72b carried by said plates being adapted to engage said stop. However, as shown in Figure 13, this stop 102 is a limiting position for the away from the roll rotation of the bell crank assembly 72 about the shaft 47; or, if the shaft 47 is connected to the bell crank 72, it is a limit to the away from the roll movement of the bell crank assembly with such shaft 47. As shown in Figure 13, the stop 102 positions the parts so that a so-called "normal down" position of the shoe 61 away from the roll 10 is effected when the roller 72a at the end of the bell crank lever assembly 72 is in contact with the stop 102. It is noted on reference to Figure 13 that the lever 64 is, under such conditions, still away from the stop 101. However, it is also apparent upon inspection of Figure 13, that the stop member 75 is in contact with the stop 76 which is a limitation on the rotation of the member 67 about the pivot 71 in a clockwise direction. Therefore, with the mechanism in the position shown in Figure 13, the operator may grasp the table 62 or any part of the assembly at the top thereof and pull the assembly toward the operator to a safety position shown in Figure 17. This movement will cause a rotation of the member 67—69 about the pivot 71, the bell crank assembly 72 remaining against its stop 102 and, at the same time, the lever 64 will move about its pivot 66. Therefore, when the mechanism is in the "normal down" position, it may be swung at will to the safety position shown in Figure 17. It is noted that there is a spring 103 attached at one end thereof to the lever 64 and attached at its other end to a member 103a so that said spring normally urges this lever in a clockwise direction about the pivot 66. Therefore, the movement above described will be against the tension of this spring 103, which spring is relatively weak but of sufficient tension to require some force to move the assembly relative to the roll 10 from the position of Figure 13 to the more remote position of Figure 17.

As has been previously mentioned, the drive mechanism comprising cam 45 may be actuated to move the shaft 47 so that the shoe 61 will be moved from the "normal down" position, as shown in Figure 13, to the ironing position in contact with the shoe 10 shown in Figure 14. Such movement is produced by the movement of the actuating arm 54, by the movement of the knee control 50, so that the actuating arm 54 is moved upwardly away from contact with the pivot lever member 51 so that its spring 53 will allow the pin 49 to make a driving contact with the clutch member 33 and thus rotate the cam 45 a half revolution until the actuating arm 54 which, if allowed to assume its normal position, will again release the pin 49 from the clutch member 33 and position the arm 46 and its associated mechanism to maintain the ironing shoe 61 in the position shown in Figure 14. During the rotation of the cam 45, the cam member 57 carried thereby will contact the projecting pin 58 of the actuating yoke 39 and cause the roll clutch 33—36 to be engaged at the proper time to have the roll rotating at the time contact of the shoe 61 is had with the roll 10. It is noted on reference to Figures 13 and 14 that as the shaft 47 rotates in a clockwise direction it carries with it the bell crank assembly 72 as long as the solenoid 93 is energized to hold the several lever members in contact and thus the shoe assembly 61 moves upwardly toward the roll 10; and as this movement starts from the position of Figure 13, there is a movement also of the lever 64 about the pivot 66 and the pivot 65 and, as the upward movement continues, the rotation of the lever 64 about the pivot 66 in a clockwise direction and toward the stop 101 for such lever, the arrangement of the several parts of the mechanism is such that contact of the lever 66 with the stop 101 occurs before the shoe 61 contacts the roll 10 and therefore the subsequent movement of the shoe 61 must cause rotation about the pivot 65 without further rotation about pivot 66, and the movement of the shoe 61 will be more nearly vertical than would be the case if the movement of the lever 64 about the pivot 66 was not arrested, since such movement would allow a sliding of the shoe 61 toward the right and would produce an objectionable sliding contact of the shoe 61 with the roll 10. Therefore, this last movement of the shoe 61 toward the roll 10 requires a rotation of the member 67—69 about the pivot 71 and causes the stop member 75 to move away from the stop 76 to the position shown in Figure 14.

As the shoe 61 contacts the roll 10, it is assumed that the adjustment of the spring 73 provided by the nut 74 is such that sufficient ironing pressure will be exerted by the action of the spring 73. It is noted that the arrangement of the assembly of the spring 73 and the member 67—69 is such that the tension of the spring 73 may be varied by the adjustment provided and also the relative position of the shoe 61 and roll 10 may be controlled to bring contact at the desired time by adjustment of the nut 67 relative to the member 69. There is, therefore, both an adjustment of spring tension by means of the nut 74, and adjustment of shoe position by means of the nut 67; thus providing separate adjustments for these two variables.

Assume that the shoe is in contact with the roll, as is shown in Figure 14, and it is desired to effect, for some reason, an emergency release of the shoe. Such result may be accomplished by any mechanism which will produce a break in the electrical circuit to the solenoid 93. And such release is provided by an emergency release lever 104 (Figure 18), which operates a master switch 105 through a linkage comprising a bell crank 105a having one end of a rod 106 secured thereto. A shaft 106a is mounted in a bracket 106b and carries an arm 106c which is pivotally connected to one end of the rod 106. A bell crank 107 is secured to the shaft 106a and one arm thereof is arranged to control the master switch 105 and the other arm is connected to one end of a rod 108. A spring 108a interconnects the bell crank levers 105a and 107 and is arranged to position the bell crank 107 to normally maintain the switch 105 closed. The spring 108a is arranged to provide an over-center toggle connection between the bell crank levers 105a and 107, with respect to the shaft 106a as an axis. The opposite end of the rod 108 is pivotally connected at 108b (Figure 18A) to one end of a rocker lever 108d. The rocker lever 108d is pivotally supported at 108e upon a bracket 108f. A roller 108g is carried by the rocker lever 108d in a position where it can engage a lower edge of the shoe supporting lever 64.

It will be understood from the foregoing that actuation of the safety release lever 104, in the direction of the arrow of Figure 18, will result in a pull being applied to the rod 108 through the bell crank 105a, rod 106, arm 106c, shaft 106a and the bell crank 107, and that such pull will cause the rocker lever 108d to pivot counterclockwise, as viewed in Figure 18A about its pivot 108e with the result that the roller 108g will push the supporting lever 64 in a counterclockwise direction about the pivot 66 and effect movement of the shoe 61 away from the roll 10 to its safety position. The rocker lever 108d is shown in dot-and-dash lines in Figure 16 to illustrate the manner in which the supporting lever 64 is pushed to move the shoe 61 to its safety position.

It will be apparent from an inspection of Figures 14 and 15 that when the solenoid 93 is de-energized the solenoid latch lever 88 will be moved in a counter-clockwise direction about the pin 89 and release the end of the intermediate latching member 83, thereby permitting the supporting face 82 to move in a clockwise direction around the pivot 84 and cause the abutment 81 to slip off the face 82 and allow the entire bell crank assembly 72 to swing free about the shaft 47 by such release of the abutment member; the pusher lever 79 then allowing the shoe 61 to drop downwardly to the position shown in Figure 15 with the bell crank assembly resting upon its stop 102. Furthermore, if the emergency release lever 104 is moved positively in the direction indicated by the arrow in Figure 18, it will actuate the rod 108, as previously described, to provide a pushing force on the lever 64 to push the entire shoe supporting linkage assembly to the position shown in Figure 16, which is the maximum open position for emergency release. It would also be possible, of course, to manually pull the shoe 61 from the normal down position shown in Fig. 15 to the maximum open position shown in Figure 16, as is always the case when the shoe 61 is away from the roll 10.

Figure 19 shows a wiring diagram in which a circuit is provided from a standard 110 volt circuit with the master switch 105, which is normally closed, connected in series in this circuit this being the same switch as shown on Figure 18 and which is controlled by the emergency release lever 104. In this circuit also there is provided a series connection for the driving motor 109, which drives the worm 34 for continuous rotation of the clutch member 33.

A circuit is also provided to place the solenoid 93 in series with the switch 110 controlling the motor circuit but in parallel with the motor. The circuit also provides for a heat control to the ironer shoe which circuit is controlled by the heat switch 111. Inasmuch as the heat control forms no part of the present invention it is not shown in detail herein.

In normal operation of the machine when ready to start ironing the shoe and table 61, 62 are in the normal down position shown in Figure 13, that is with the shoe 61 away from the roll 10.

Figure 7:
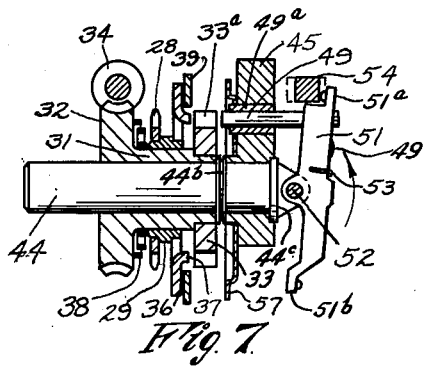
Figures 7 and 8 are side and end views, respectively, partly in section, showing the position of the parts of the driving mechanism when the shoe is away from the roll, but ready to be actuated to be moved toward the roll.
Figure 8:
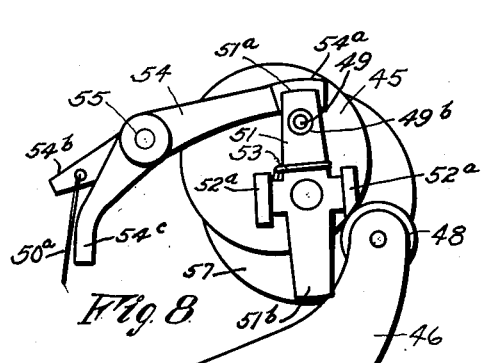

Figures 7 and 8 show the drive mechanism in a position corresponding to that which locates the ironing shoe 61 in its maximum normal position away from the roll 10. In this position, the cam 45 is stationary and the pin 49 is held out of contact with the clutch member 33 because of the fact that the actuating arm 54 is in the path of the end 51ᵃ of the pivoted lever 51 thereby holding the pin 49 away from the clutch member 33.

When in the process of ironing it is desired to move the shoe 61 upward into contact with the roll 10 it is assumed that the shoe 61 is heated and that the circuit to the motor 109 is closed by closing the motor switch 110 and therefore the worm 34 is rotating, which in turn produces continuous rotation of the clutch member 33. At this time the drive mechanism will be in the position shown in Figures 7 and 8 with the pin 49 and actuating yoke 39 and lever 51 in position such as to hold both the roll and shoe drives inactive, that is, with plate 36 and pin 49 both out of contact with the clutch member 33. Under such conditions, if the knee control 50 is then actuated the result will be that the actuating arm 54 will be lifted away from contact with the lever 51 and the spring 53 on said lever will cause the pin 49 to slide into contact with one of the notches 33ᵃ in the clutch member 33, as shown in Figures 9 and 10, and thereby carry the cam 45 to the position shown in Figures 11 and 12, which is a half revolution or 180 degrees of rotation. Such rotation of the cam moves the shaft 47 into a position such as to bring the ironing shoe 61 into contact with the roll 10 as shown in Figure 14. The cam 45 is then stopped in its rotation because of the fact that the end 54ᵃ of the actuating arm 54, which is in the path of the ends of lever 51, again contacts the lever 51, this time on the opposite end 51ᵇ and on the opposite side of said lever, thereby pulling the pin 49 out of contact with the clutch member 33, and thus causing the cam 45 to stop its rotation. It is apparent on inspection of Figure 12 that the lever 46 is in a maximum position which corresponds to the position which brings the shoe 61 into ironing contact with the roll 10 and such position is held until the actuating arm 54 is again moved to pull the arm end 54ᵃ thereof out of contact with the pivoted lever 51 and thereby allow such lever to push the pin 49 into contact with the clutch member 33 and to again drive the cam 45 for a half revolution, thereby to put the cam 45 in position corresponding to the shoe 61 being in the normal down position away from the roll 10.

From the normal ironing position of Figure 14 the emergency release can be effected, if desired, by the operation of the emergency release lever 104, as previously described. Or normal release can be had on a subsequent actuation of the knee control 50 when the shoe 61 will move away from the roll 10 to the position in Figure 13 on a subsequent half revolution of the cam 45. Then, by successive actuations of the knee control lever, the shoe 61 may be alternately brought into contact and out of contact with the ironer roll 10 at the will of the operator.

It is believed that the other features of operation have been sufficiently described in the general description of the mechanism.

Although reference has been made in the foregoing specification to a specific construction it is intended that various modifications may be made without departing from the fundamental principles herein disclosed and within the scope of the following claims.

I claim:

1. In an ironing machine, a roll, an ironing shoe mounted in a substantially horizontal plane below said roll and adapted for movement toward and away from said roll, bracket members extending from the front edge of said shoe, a front support lever positioned substantially vertically when said shoe is spaced away from said roll, an upper pivot connecting said front support lever to said bracket members, a lower pivot supporting said front support lever, a support member under said shoe, a pivot connecting said support member under said shoe, a bell crank member, a pivotal connection between said bell crank member and the lower portion of said support member, mechanism to oscillate said bell crank member thereby to move said shoe toward and away from said roll, a stop for limiting movement of said front support lever about its lower pivot, a second stop for limiting movement of said support member under said shoe about its lower pivot relative to said bell crank, said stops being so positioned as to arrest movement of said front support lever about its lower pivot during the latter portion of the movement of said shoe toward said roll prior to the contact of said shoe with said roll, whereby the final movement of said shoe is in a direction substantially controlled by the movement of said shoe about said upper pivot of said front support lever.

2. In an ironing machine, a roll, an ironing shoe mounted in a substantially horizontal plane below said roll and adapted for movement toward and away from said roll, support levers extending downwardly from said shoe in front of and centrally of said shoe and positioned substantially vertically when said shoe is spaced away from said roll, upper and lower pivotal connections for said support levers mounting said shoe to be moved toward and away from said roll, mechanism for actuating said support levers to move said shoe, stops for arresting movement about said lower pivotal connections so positioned as to arrest movement about said front lower pivotal connection during the latter portion of the movement of said shoe toward said roll prior to the contact of said shoe with roll, whereby the final movement of said shoe is in a direction substantially controlled by the movement of said shoe about said front upper pivotal connection as a center.

3. In an ironing machine, a roll, a shoe, and means for moving said shoe toward and away from said roll comprising: a supporting member including an end piece, means pivotally connecting said end piece with said shoe, a rod adjustably connected at its upper end with said end piece, an actuating member for said shoe, a pin rotatably carried by said actuating member, said pin having an opening and the lower portion of said rod extending slidably through said opening, a stop carried by said actuating member, an abutment on said pin adapted to abut said stop, and a spring surrounding said rod between said pin and said end piece.

4. In an ironing machine, a roll, a shoe, and means for moving said shoe toward and away from said roll comprising: a supporting lever including an end member, means pivotally connecting said end member with said shoe, a rod connected at its upper end to said end member, an actuating member for said shoe, a pin rotatably carried by said actuating member, said pin having an opening and said rod extending slidably through said opening, a compression spring surrounding said rod on one side of said pin between said pin and said end member, a stop carried by said actuating member, an abutment on said pin adapted to abut said stop, and means on said rod between said spring and said end member for adjusting the compression of said spring.

5. In an ironing machine, a roll, a shoe, and means for moving said shoe toward and away from said roll comprising: a supporting member including an end piece, means pivotally connecting said end piece with said shoe, a threaded rod adjustably connected at its upper end to said end piece, an actuating member for said shoe, a pin rotatably carried by said actuating member, said pin having an opening and the lower portion of said rod extending slidably through said opening, a compression spring surrounding said rod between said pin and said end piece, a stop carried by said actuating member, an abutment on said pin adapted to abut said stop, and means on the threaded portion of said rod between said spring and said end piece for adjusting the compression of said spring.

ARTHUR R. CONSTANTINE.

REFERENCES CITED

The following references are of record in the file of this patent:

UNITED STATES PATENTS

| Number | Name | Date |
| --- | --- | --- |
| 1,576,804 | Arbron | Mar. 16, 1926 |
| 1,582,243 | Braun | Apr. 27, 1926 |
| 1,670,742 | Richards | May 22, 1928 |
| 1,677,666 | Weller | July 17, 1928 |
| 1,782,572 | Janda | Nov. 25, 1930 |
| 1,865,048 | Ringer | June 28, 1932 |
| 1,970,511 | Foley | Aug. 14, 1934 |
| 1,987,332 | Gallagher | Jan. 8, 1935 |
| 2,056,666 | Geldhof | Oct. 6, 1936 |
| 2,084,383 | Clement | June 23, 1937 |
| 2,090,686 | La Rue | Aug. 24, 1937 |
| 2,291,059 | Ringer | July 28, 1942 |
| 2,346,374 | Freis | Apr. 11, 1944 |
| 2,365,542 | Freis | Dec. 19, 1944 |
| 2,456,385 | Constantine | Dec. 14, 1948 |